United States Patent
Takahashi et al.

(10) Patent No.: US 9,903,439 B2
(45) Date of Patent: Feb. 27, 2018

(54) TORSIONAL VIBRATION DAMPER

(71) Applicant: TOYOTA JIDOSHA KABUSHIKI KAISHA, Toyota-shi, Aichi-ken (JP)

(72) Inventors: Yuya Takahashi, Susono (JP); Tadashi Sekiguchi, Kanagawa-ken (JP); Morihiro Matsumoto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/082,076

(22) Filed: Mar. 28, 2016

(65) Prior Publication Data
US 2016/0290434 A1 Oct. 6, 2016

(30) Foreign Application Priority Data

Mar. 30, 2015 (JP) .................. 2015-068124

(51) Int. Cl.
*F16H 15/14* (2006.01)
*F16F 15/14* (2006.01)
*F16H 1/28* (2006.01)

(52) U.S. Cl.
CPC ............. *F16F 15/145* (2013.01); *F16H 1/28* (2013.01)

(58) Field of Classification Search
None
See application file for complete search history.

(56) References Cited

U.S. PATENT DOCUMENTS

| 4,856,639 | A | * | 8/1989 | Fukushima | ......... F16F 15/1207 192/214 |
| 5,863,274 | A | | 1/1999 | Jackel | |
| 9,163,696 | B2 | * | 10/2015 | Ukon | .................. F16F 15/1478 |
| 2015/0308540 | A1 | * | 10/2015 | Lorenz | .............. F16F 15/13157 464/68.1 |
| 2015/0369333 | A1 | * | 12/2015 | Grobgebauer | ........ F16F 15/121 475/16 |
| 2015/0377321 | A1 | * | 12/2015 | Dieckhoff | ......... F16F 15/13157 475/35 |

FOREIGN PATENT DOCUMENTS

| DE | 9414314 U1 | * | 11/1994 | ......... F16F 15/1206 |
| DE | 19846445 A1 | * | 3/2000 | ............. F16H 45/02 |
| DE | 102007032678 A1 | * | 1/2009 | ............. F16H 45/02 |
| DE | 102007023139 A1 | * | 2/2009 | ............. B60K 17/04 |
| DE | 102013214351 A1 | * | 1/2015 | ............. F16H 57/08 |
| DE | 102013214353 A1 | | 1/2015 | |
| DE | 102013219033 A1 | * | 3/2015 | ............. F16H 57/08 |
| DE | 102013018996 A1 | * | 5/2015 | ......... F16F 15/1205 |

(Continued)

*Primary Examiner* — Dirk Wright
(74) *Attorney, Agent, or Firm* — Andrews Kurth Kenyon LLP

(57) ABSTRACT

A torsional vibration damper having enhanced vibration damping performance is provided. The torsional vibration damper comprises: a vacant area existing between an outer circumference of the sun gear and an inner circumference of the ring gear outside of a revolving range of the planetary gears revolved as a result of relative rotation between the sun and the ring gear; and a mass increasing portion that is formed on the rotary member other than an input element and an output element within the vacant area in such a manner as to protrude from the rotary member.

2 Claims, 9 Drawing Sheets

(56) References Cited

FOREIGN PATENT DOCUMENTS

| | | | |
|---|---|---|---|
| DE | 102014204907 A1 | 9/2015 | |
| DE | 102014207465 A1 | 10/2015 | |
| GB | 2346194 A * | 8/2000 | ........ F16F 15/13157 |
| JP | H09-196122 A | 7/1997 | |
| JP | 2008-163977 A | 7/2008 | |
| JP | 2009-014022 A | 1/2009 | |
| JP | 2010-001905 A | 1/2010 | |

* cited by examiner

TORSIONAL VIBRATION DAMPER

CROSS-REFERENCE TO RELATED APPLICATIONS

The present invention claims the benefit of Japanese Patent Application No. 2015-068124 filed on Mar. 30, 2015 with the Japanese Patent Office, the disclosures of which are incorporated herein by reference in its entirety.

BACKGROUND

Field of the Invention

The present invention relates to the art of a vibration damper for suppressing torque pulses (i.e., vibrations) by an inertial torque.

Discussion of the Related Art

U.S. Pat. No. 5,863,274 describes a torsional vibration damping apparatus comprising a planetary transmission in which a sun gear serves as an input element, and a carrier or a ring gear serves as an output element. In the planetary transmission, the sun gear is connected to a first mass, and the carrier or the ring gear is connected to a second mass. According to the teachings of U.S. Pat. No. 5,863,274, coil springs are interposed between any of two rotary elements of the planetary transmission in such a manner as to permit an angular displacement therebetween to an extent which depends upon the extent of deformation of the coil springs.

The planetary gear unit used in a vibration damper is also described e.g., in JP-A-2009-14022 and JP-A-2010-1905. In the inertia device taught by JP-A-2009-14022, the planetary gear unit is used to obtain a large inertia force by increasing rotational speed of an inertia ring to be higher than an input speed. In turn, in the rotation fluctuation reduction device taught by JP-A-2010-1905, one of rotary elements of the planetary gear unit is connected to an output shaft of an engine to serve as an input element, other rotary element is attached to an inertial mass, and still another rotary element is selectively halted by a brake. According to the teachings of JP-A-2010-1905, an inertia torque counteracting torsional vibrations of the output shaft can be changed by halting a rotation of predetermined rotary element by the brake.

In the above-explained prior art documents, an inertial force counteracting vibrations is established by an inertial mass connected to any of the rotary elements of the planetary gear unit, and such inertial force can be increased by enlarging the inertial mass. According to the teachings of the above-explained prior art documents, however, the inertial masses are arranged in an axial direction of the planetary gear unit, and hence an axial length of the planetary gear unit may be elongated if the inertial masses are enlarged. Consequently, the vibration damping device may not be fitted into a powertrain easily.

SUMMARY

Aspects of the present invention have been conceived noting the foregoing technical problems, and it is therefore an object of the present invention is to provide a torsional vibration damper in which a vibration damping performance in a low speed range is enhanced without being elongated in an axial direction.

The torsional vibration damper according to the preferred example comprises a planetary unit that performs a differential action among a sun element as a rotational center element, a ring element arranged concentrically with the sun element, and a carrier element supporting planetary elements interposed between the sun element and the ring element in a rotatable and revolvable manner. In the planetary unit, any of the sun element, the ring element and the carrier element serves as an input element to which torque is applied, and any of another rotary element serves as an output element. In addition, the input element is connected to the output element through an elastic member while being allowed to rotate relatively with each other. In order to achieve the above-explained objective, according to the preferred embodiment of the present application, the torsional vibration damping device is provided with: a vacant area that exists between an outer circumference of the sun element and an inner circumference of the ring element outside of a revolving range of the planetary gears revolved as a result of relative rotation between the sun element and the ring element; and a mass increasing portion that is formed on the rotary member other than the input element and the output element within the vacant area in such a manner as to protrude from the rotary member.

In a non-limiting embodiment, a planetary gear unit having a sun gear serves as the sun element, a ring gear serves as the ring element, planetary gears serve as the planetary elements, and a carrier serves as the carrier element may be used as the planetary unit. In this case, the mass increasing portion may be formed on the sun gear.

In the torsional vibration damper according to the present application, the input element and the output element connected through the elastic member are rotated relatively by pulsation of torque applied to the input element. Consequently, the remaining rotary element is rotated by a differential action of the planetary unit to establish an inertial force counteracting the torque pulse in accordance with a mass thereof. That is, the rotary element other than the input element and the output element serves as an inertial mass to suppress torsional vibrations. According to the present application, a mass of the rotary member serving as an inertial mass is increased by the mass increasing portion so that vibration damping performance of the torsional vibration damper can be enhanced especially in a low speed range. In addition, the mass increasing portion is formed on the rotary member other than the input element and the output element within the vacant area where the planetary gears do not rolls thereon even if the sun element and the ring element are rotated relatively by pulsation of the torque applied to the input element. According to the present application, therefore, a mass of the rotary element serving as an inertial mass can be increased without elongating an axial length of the planetary unit.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 1b is a cross-sectional view of the planetary unit along the b-b line in FIG. 1a;

FIG. 3b is a cross-sectional view of the mass increasing portion along the b-b line in FIG. 3a;

FIG. 4b is a cross-sectional view of the mass increasing portion along the b-b line in FIG. 4a;

FIG. 6b is a cross-sectional view of the planetary unit according to another embodiment along the b-b line in FIG. 6a;

FIG. 8b is a cross-sectional view of the planetary unit according to still another embodiment along the b-b line in FIG. 8a;

DETAILED DESCRIPTION OF THE PREFERRED EMBODIMENT(S)

Figure 1A:
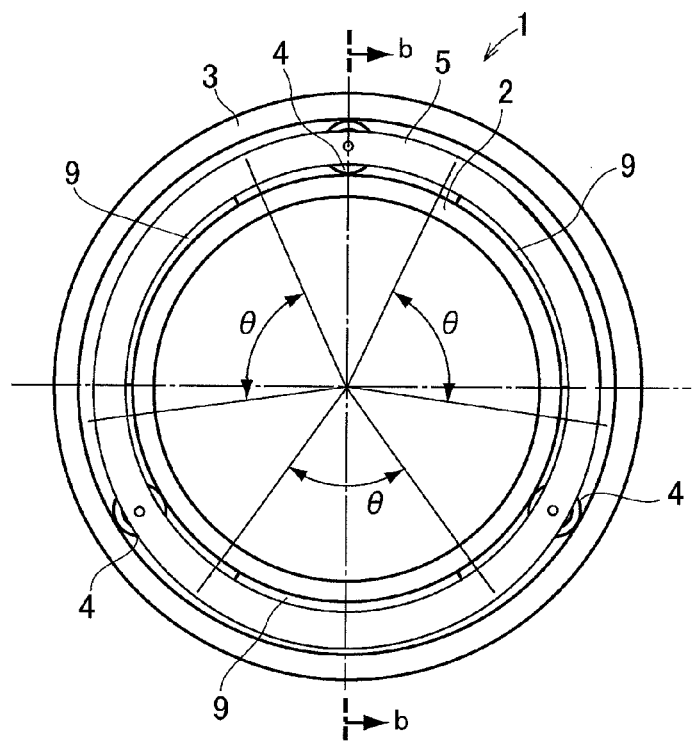
FIG. 1a is a front view of the planetary unit according to the preferred embodiment.
Figure 1B:
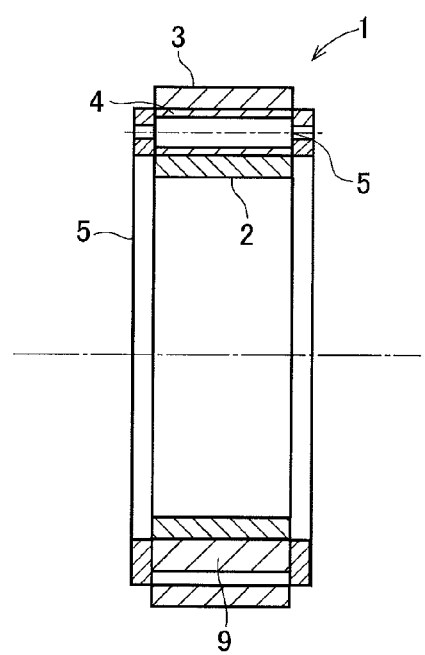

The preferred embodiments of the present application will now be explained in more detail with reference to the accompanying drawings. Referring now to FIG. 1, there is shown one example of the planetary unit 1 as a main part of the torsional vibration damper that is adapted to perform a differential action among three rotary elements. For example, a planetary gear unit and a planetary roller unit may be used as the planetary unit 1. Specifically, the planetary unit comprises a sun element 2 as a rotational center element, a ring element 3 arranged concentrically with the sun element 2, a plurality of planetary elements 4 interposed between the sun element 2 and the ring element 3, and a carrier element 5 supporting the planetary element 4 in a rotatable and revolvable manner. Given that the planetary gear unit is used as the planetary unit 1, the sun element 2 is a sun gear as an external gear, the ring element 3 is a ring gear as an internal gear, the planetary elements 4 are pinion gears, and the carrier element 5 is a carrier. By contrast, given that the planetary roller unit is used as the planetary unit 1, the sun element 2 is a sun roller having a rolling surface on its outer circumferential face, the ring element 3 is a ring roller having a rolling surface on its inner circumferential face, the planetary elements 4 are cylindrical or column pinion rollers, and the planetary elements 4 interposed between the sun roller and the ring roller are supported by a carrier 5. In the planetary roller unit, the pinion rollers have to be clamped tightly by the sun roller and the ring roller so as to ensure a desired torque transmitting capacity. By contrast, in the planetary gear unit, the pinion gears mesh with the sun gear and the ring gear so that the desired torque transmitting capacity is ensured. Optionally, a double-pinion planetary gear unit may also be used as the planetary unit 1 according to need.

Figure 2A:
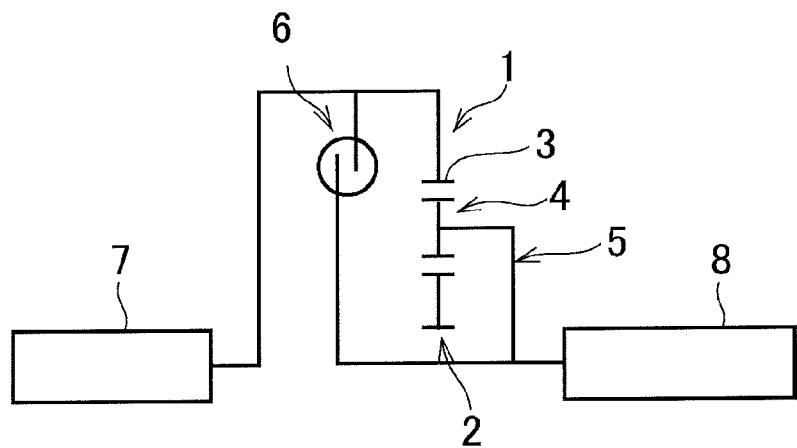
FIG. 2a is a skeleton diagram showing the planetary unit arranged in a power train in which the ring gear serves as an input element and the carrier serves as an output element.
Figure 2B:
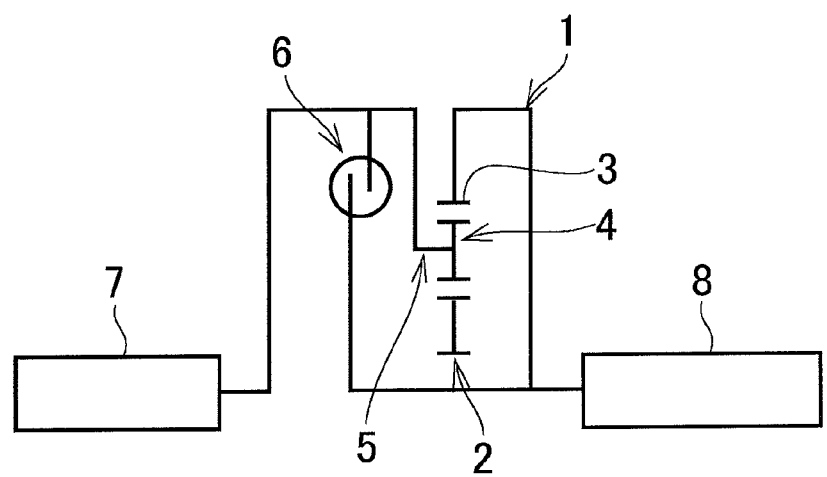
FIG. 2b is a skeleton diagram showing the planetary unit arranged in a power train in which the ring gear serves as an output element and the carrier serves as an input element.

Turning to FIG. 2, there is shown an example of the torsional vibration damper arranged in a predetermined powertrain in which a single-pinion planetary gear unit is used as the planetary unit 1. In the example shown in FIG. 2a, specifically, the ring gear 3 serves as an input element, the carrier 5 serves as an output element, and the ring gear 3 is connected to the carrier 5 through a spring damper 6 as the claimed elastic member. In the example shown in FIG. 2a, therefore, the ring gear 3 and the carrier 5 are allowed to rotate relatively with each other within a predetermined angle governed by a structure of the spring damper 6, and an elastic force of the spring damper 6 counteracts to a torque applied to the ring gear 3. The ring gear 3 is also connected to a prime mover (e.g., an internal combustion engine) 7, and the carrier 5 is also connected to a driven member 8 such as a transmission. That is, pulsed torque is applied to the ring gear 3 and the carrier 5.

Specifically, when a torque of the prime mover 7 is applied to the ring gear 3, the carrier 5 is subjected to a reaction of the torque rotating the driven member 8. Consequently, the ring gear 3 and the carrier 5 are rotated relatively with each other while compressing the spring damper 6 in accordance with the compressing load. In this situation, the sun gear 2 as a rotational center is also rotated in accordance with an angle of relative rotation between the ring gear 3 and the carrier 5. If the torque of the prime mover 7 applied to the ring gear 3 is stable, the planetary unit 1 is rotated integrally to deliver the torque to the driven member 8.

The compression force (i.e., a torsional force) is changed by pulsation of the torque applied to the ring gear 3 thereby causing a relative rotation between the ring gear 3 and the carrier 5. Since such relative rotation between the ring gear 3 and the carrier 5 is caused by the torque pulse, an angle of the relative rotation between the ring gear 3 and the carrier 5 is rather small. In this situation, therefore, the pinion gears 4 revolve around the sun gear 2 only within a predetermined angle. A vacant area θ as an unused area of the sun gear 2 where the pinion gear 4 does not roll thereon is not involved directly in a torque transmission and a differential rotation but involved in maintenance of strength and shape of the sun gear 2.

Figure 3A:
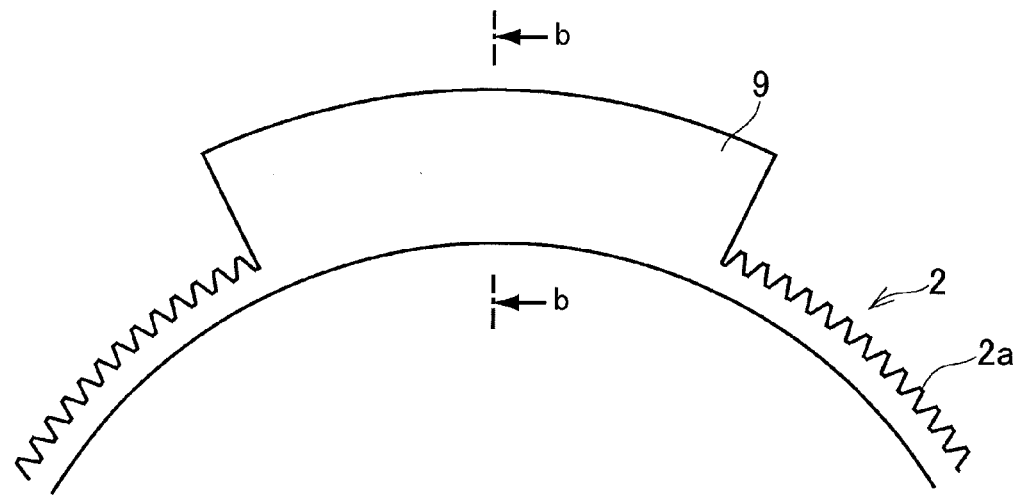
FIG. 3a is a front view of the mass increasing portion formed integrally with the sun gear.
Figure 3B:
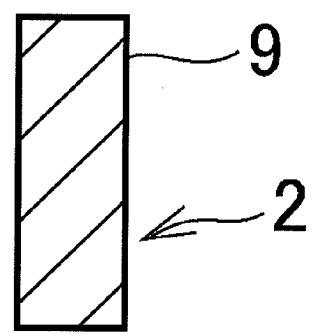
Figure 4A:
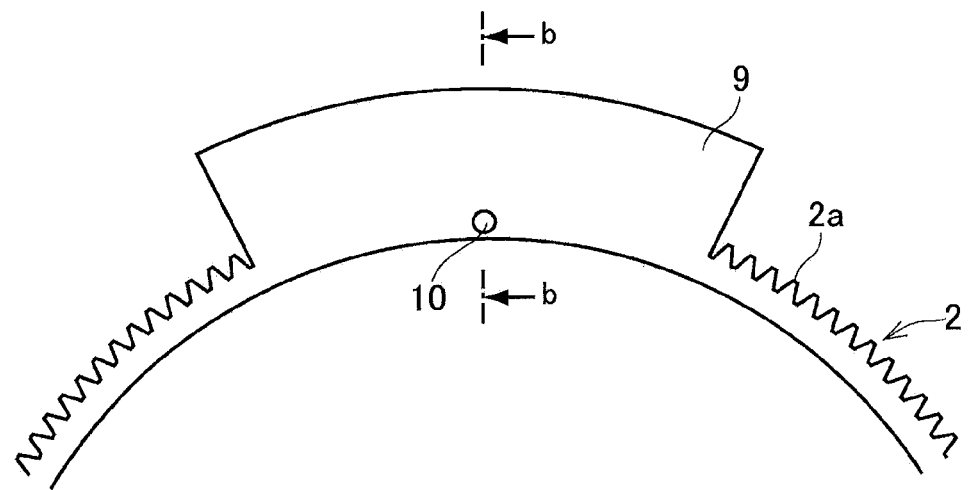
FIG. 4a is a front view of the mass increasing portion attached to the sun gear by a bolt or a rivet.
Figure 4B:
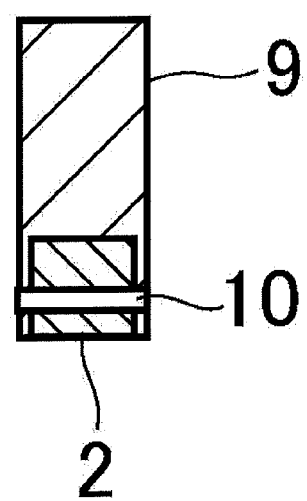

As described, the sun gear 2 is rotated or reciprocated as a result of the relative rotation between the ring gear 3 and the carrier 5 within the predetermined angle. Consequently, an inertial torque is established by such rotation of the sun gear 2 in accordance with an angular velocity and a mass of the sun gear 2. In the planetary unit 1 shown in FIGS. 1 and 2, a mass increasing portion 9 is formed at least partially within the vacant area θ of the sun gear 2 in such a manner as to protrude radially outwardly. For example, as illustrated in FIGS. 3a and 3b, the mass increasing portion 9 may be formed by partially expanding an outer circumference of the sun gear 2 to increase a thickness thereof instead of forming the teeth 2a. Alternatively, as illustrated in FIGS. 4a and 4b, the mass increasing portion 9 may also be formed by attaching a mass piece having a thickness higher than a height of each tooth 2a to the outer circumference of the sun gear 2 by a rivet or a bolt 10. In the planetary unit 1, therefore, a mass of the sun gear 2 per unit of circumferential length can be increased at the mass increasing portion 9 to be larger than that of the remaining portion. In addition, since the mass increasing portion 9 is formed by partially expanding the sun gear 2 radially outwardly in the planetary unit 1, a mass of the sun gear 2 can be increased without elongating an axial length of the planetary unit 1.

Figure 5:
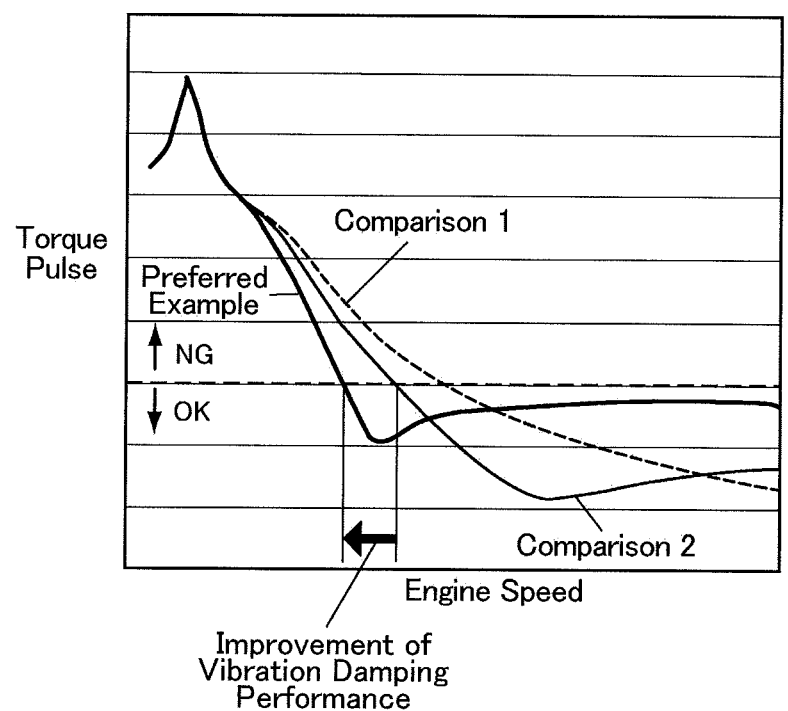
FIG. 5 is a graph indicating vibration damping performances of the vibration damper according to the preferred embodiment and the conventional vibration damper.

In the torsional vibration damper thus formed by the planetary unit 1 and the spring damper 6, the ring gear 3 and the carrier 5 are rotated relatively from each other within the predetermined angle by a pulsation of torsional torque applied to the spring damper 6 resulting from pulsation of the torque applied to the ring gear 3. Consequently, the sun gear 2 is oscillated within the predetermined angle by the differential action of the planetary unit 1, and vibrations are damped by the inertial torque resulting from oscillation of the sun gear 2. Such vibration damping performance of the sun gear 2 can be enhanced within the low speed range by increasing a mass of the sun gear 2. Turning to FIG. 5, there is shown a comparison result of the vibration damping performance between the torsional vibration damper according to the preferred embodiment and the conventional torsional vibration damper. In FIG. 5, the dashed curve represents pulsation of torque according to the first comparison example in which only the spring damper 6 is used in the powertrain to damp vibrations, the thinner curve represents pulsation of torque according to the second comparison example in which the conventional planetary unit without having the mass increasing portion 9 is used in the powertrain to damp vibrations, and the thicker line represents pulsation of torque according to the preferred embodiment. In FIG. 5, specifically, the horizontal axis represents an engine speed, and the vertical axis represents a pulsation of torque (i.e., a propagation gain of vibration), and the dashed horizontal line represents a criterion of acceptable pulsation of torque. As can be seen from FIG. 5, vibration damping performance of the torsional vibration damper according to the preferred embodiment is obviously enhanced within the low speed range of the engine.

Turning back to FIG. 2b, there is shown a modification example of the torsional vibration damper. In the embodiment shown in FIG. 2b, the input element and the output element are switched. Specifically, the ring gear 3 is connected to the driven member 8 to serve as the output element, and the carrier 5 is connected to the prime mover 7 to serve as the input element. In the embodiment shown in FIG. 2b, a relative rotation between the carrier 5 and the ring gear 3 is caused by pulsation of the torque applied to the spring damper 6 resulting from pulsation of input torque to the ring gear 5, and consequently the sun gear 2 is oscillated within the predetermined angle. Thus, vibrations may also be damped by the inertial torque resulting from oscillation of the sun gear 2 without extending the axial length of the planetary unit 1.

Figure 6A:
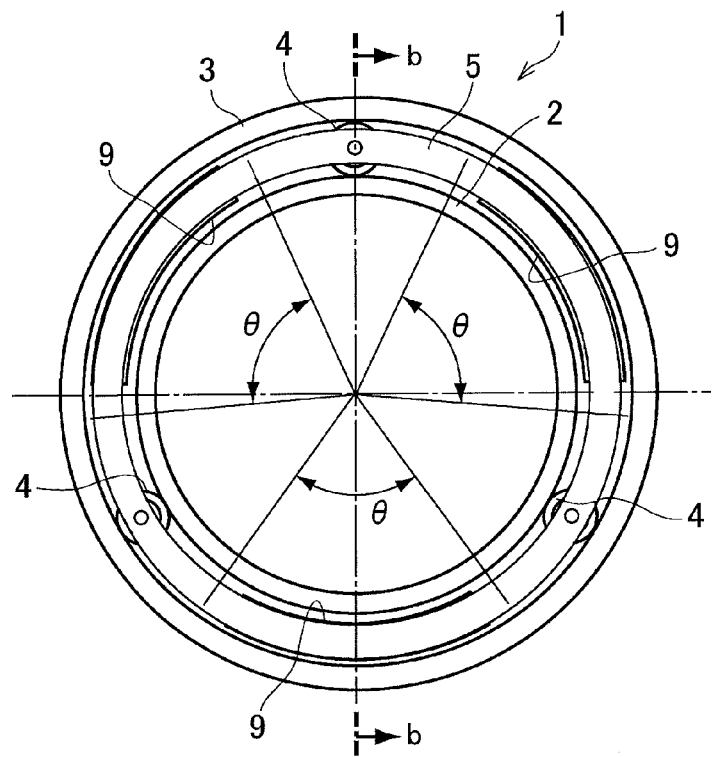
FIG. 6a is a front view of the planetary unit according to another embodiment.
Figure 6B:
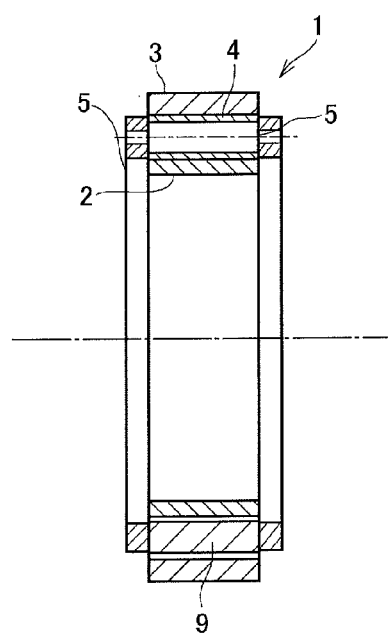

In the torsional vibration damper, the mass increasing portion 9 may also be formed on the rotary elements of the planetary unit 1 other than the sun gear 2. Turning to FIG. 6, there is shown another example of the torsional vibration damper in which the mass increasing portion 9 is formed on the carrier 5. Specifically, the carrier 5 supports the equally-spaced pinion gears 4 in a rotatable and revolvable manner, and hence each portion of the carrier 5 between the pinion gears 4 is not brought into contact to other members. That is, such clearance between the pinion gears 4 serves as the vacant area θ that is not involved in the differential action. According to the embodiment shown in FIG. 6, the mass increasing portion 9 is formed on the carrier 5 within the vacant area θ in such a manner to protrude toward the sun gear 2 and the ring gear 3. As the foregoing embodiment, the mass increasing portion 9 may be not only formed integrally with the carrier 5 but also attached to the carrier 5 by a welding method or by a screw. If the carriers 5 are arranged on both axial sides of the planetary unit 1, the mass increasing portion 9 may also be interposed between the carriers 5.

Figure 7A:
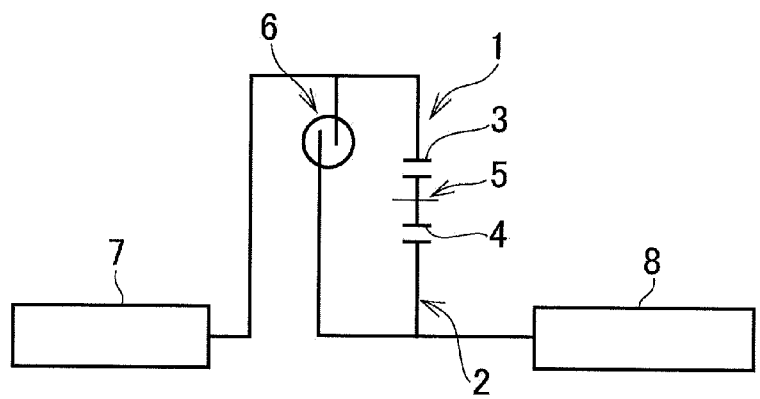
FIG. 7a is a skeleton diagram showing the planetary unit according to another embodiment arranged in a power train in which the ring gear serves as an input element and the sun gear serves as an output element.
Figure 7B:
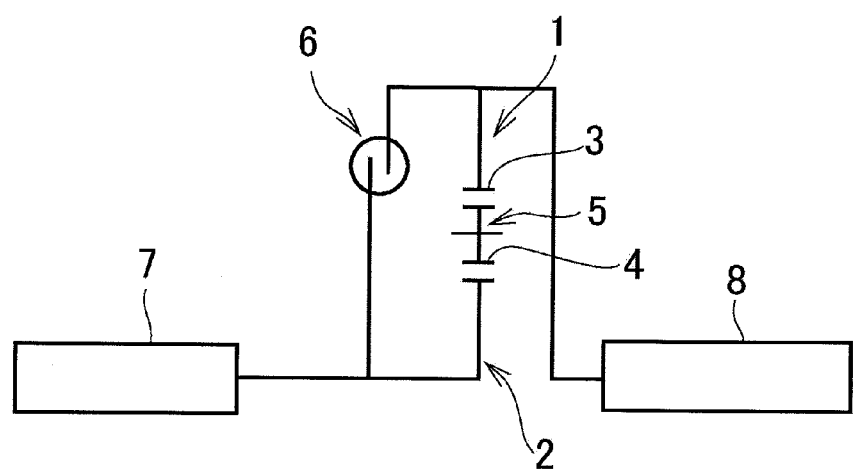
FIG. 7b is a skeleton diagram showing the planetary unit according to another embodiment arranged in a power train in which the ring gear serves as an output element and the sun gear serves as an input element.

Thus, according to the embodiment shown in FIG. 6, the carrier 5 serves as an inertial mass together with the mass increasing portion 9 to suppress vibrations. In this case, as shown in FIG. 7a, the ring gear 3 may be connected to the prime mover 7 to serve as the input element, the sun gear 2 may be connected to the driven member 8 to serve as the output element, and the spring damper 6 may be interposed between the sun gear 2 and the ring gear 3. Alternatively, as shown in FIG. 7b, the ring gear 3 may also be connected to the driven member 8 to serve as the output element, the sun gear 2 may also be connected to the prime mover 7 to serve as the input element, and the spring damper 6 may be interposed between the sun gear 2 and the ring gear 3.

Figure 8A:
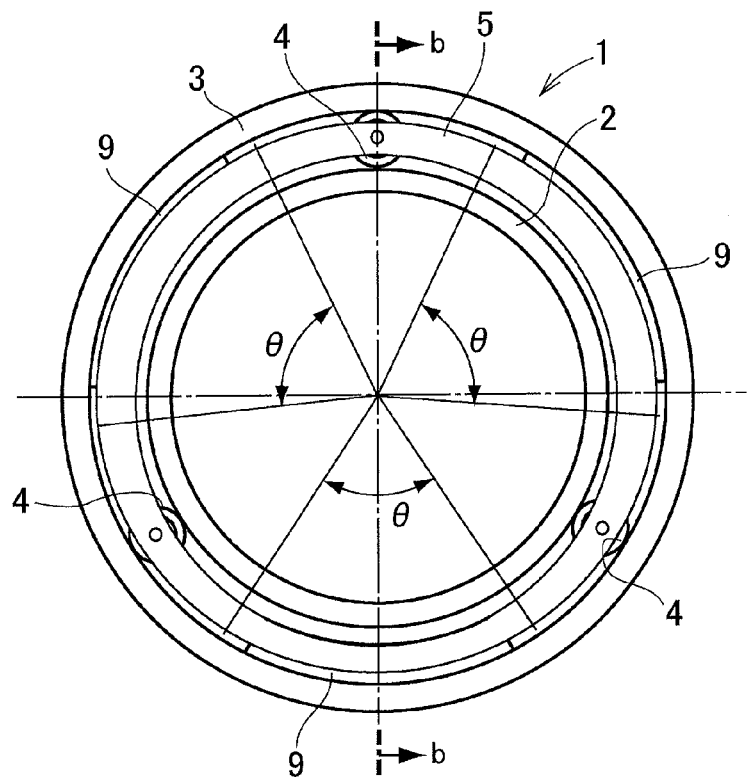
FIG. 8a is a front view of the planetary unit according to still another embodiment.
Figure 8B:
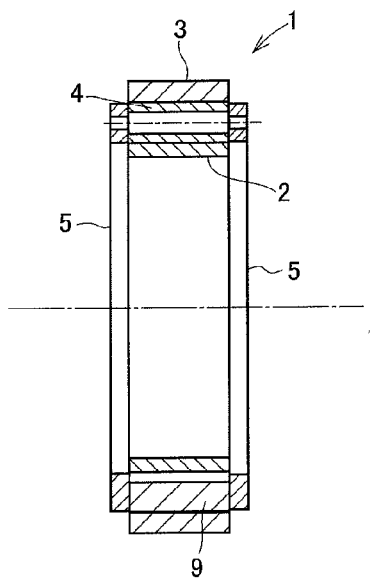

Turning to FIG. 8, there is shown still another example of the torsional vibration damper in which the mass increasing portion 9 is formed on the ring gear 3. As described, the pinion gears 4 revolve only within predetermined areas, and each area in an inner circumference of the ring gear 3 that is not brought into engagement with the pinion gear 4 serves as the vacant area θ. According to the embodiment shown in FIG. 8, therefore, the mass increasing portion 9 is formed on the inner circumference of the ring gear 3 within the vacant area θ to protrude radially inwardly. As the foregoing embodiment, the mass increasing portion 9 may be not only formed integrally with the carrier 5 but also attached to the ring gear 3 by a fixing means such as a rivet and a bolt.

Figure 9A:
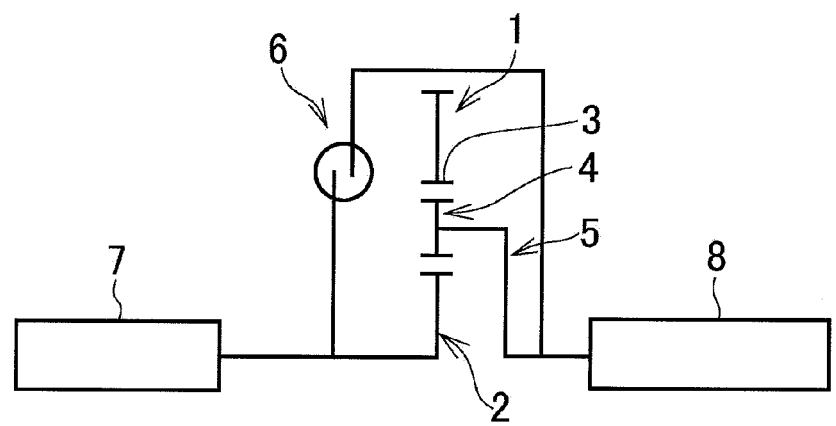
FIG. 9a is a skeleton diagram showing the planetary unit according to still another embodiment arranged in a power train in which the sun gear serves as an input element and the carrier serves as an output element.
Figure 9B:
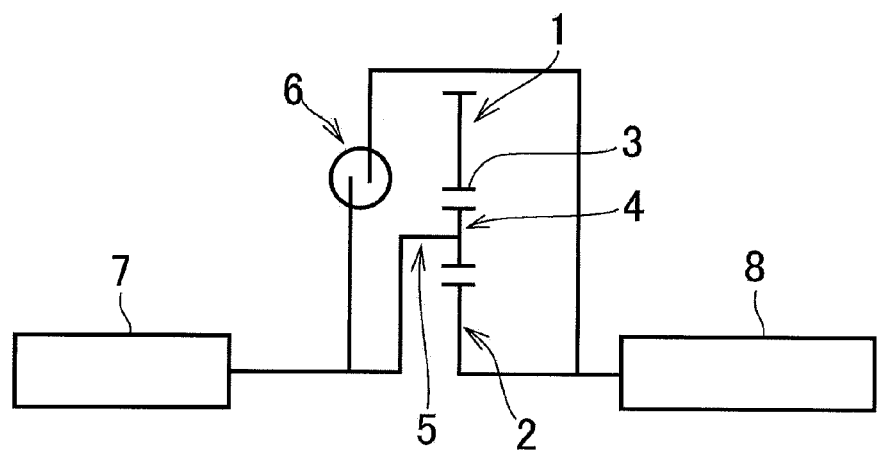
FIG. 9b is a skeleton diagram showing the planetary unit according to still another embodiment arranged in a power train in which the sun gear serves as an output element and the carrier serves as an input element.

Thus, according to the embodiment shown in FIG. 8, the ring gear 5 serves as an inertial mass together with the mass increasing portion 9 to suppress vibrations. In this case, as shown in FIG. 9a, the sun gear 2 may be connected to the prime mover 7 to serve as the input element, the carrier 5 may be connected to the driven member 8 to serve as the output element, and the spring damper 6 may be interposed between the sun gear 2 and the carrier 5. Alternatively, as shown in FIG. 9b, the sun gear 2 may also be connected to the driven member 8 to serve as the output element, the carrier 5 may also be connected to the prime mover 7 to serve as the input element, and the spring damper 6 may be interposed between the sun gear 2 and the carrier 5.

According to the embodiments shown in FIGS. 6 to 9, therefore, a mass of the carrier 5 or the ring gear 3 may also be increased without elongating an axial length of the planetary unit 1. For this reason, the vibration damping device thus having enhanced vibration damping performance may be fitted easily into a powertrain.

What is claimed is:
1. A torsional vibration damper, having:
    a planetary unit that performs a differential action among a sun element as a rotational center element, a ring element arranged concentrically with the sun element, and a carrier element supporting planetary elements interposed between the sun element and the ring element in a rotatable and revolvable manner;
    wherein any of the sun element, the ring element and the carrier element serves as an input element to which torque is applied, and any of another rotary element serves as an output element; and
    wherein the input element is connected to the output element through an elastic member while being allowed to rotate relatively with each other;

the torsional vibration damping device comprising:

a vacant area that exists between an outer circumference of the sun element and an inner circumference of the ring element outside of a revolving range of the planetary elements revolved as a result of relative rotation between the sun element and the ring element, wherein the vacant area is an unused area of the sun element, in which the planetary elements do not roll; and a mass increasing portion that is formed on the rotary member other than the input element and the output element within the vacant area in such a manner as to radially protrude from the rotary member.

2. The torsional vibration damper as claimed in claim 1, wherein the planetary unit includes a planetary gear unit having a sun gear serves as the sun element, a ring gear serves as the ring element, planetary gears serve as the planetary elements, and a carrier serves as the carrier element, and wherein the mass increasing portion is formed on the sun gear.

\* \* \* \* \*